United States Patent [19]

Kieper

[11] 3,903,749
[45] Sept. 9, 1975

[54] POWER TRANSMISSION

[76] Inventor: Reinhold R. Kieper, 8761 Avis, Detroit, Mich. 48209

[22] Filed: Mar. 15, 1974

[21] Appl. No.: 451,477

[52] U.S. Cl. ......................... 74/29; 92/58; 418/266
[51] Int. Cl. ............................................. F16h 19/04
[58] Field of Search ......... 92/58, 13; 91/497; 74/29, 74/838; 418/266

[56] References Cited
UNITED STATES PATENTS

| | | | |
|---|---|---|---|
| 1,131,072 | 3/1915 | Morin | 418/266 |
| 1,453,683 | 5/1923 | Kochendarfer | 418/266 |
| 2,217,796 | 10/1940 | Dell | 92/58 |
| 2,541,405 | 2/1951 | Chapman | 418/266 |
| 3,357,362 | 12/1967 | Orr | 92/58 |
| 3,614,265 | 10/1971 | Orhberg | 91/497 |

*Primary Examiner*—Samuel Scott
*Assistant Examiner*—Wesley S. Ratliff, Jr.
*Attorney, Agent, or Firm*—Cullen, Settle, Sloman & Cantor

[57] ABSTRACT

A power transmission includes a chambered housing having a horizontal axis with a rotatable crankshaft disposed therethrough and outwardly of the housing independently mounted upon a suitable support. A pair of diametrically opposed piston rods on said crankshaft slidably mount non-rotatively a pair of pistons which are yieldably biased outwardly. Cam rollers on said pistons bear against a continuous cam bore within said housing. Said bore includes a circular portion of maximum radius throughout 180° approximately merging into a cam surface of reduced minimum dimension which merges into a circular portion of minimum radius throughout 90° approximately and a run out arcuate portion of 90° approximately starting from said minimum radius and going to said maximum radius. The irregular cam bore providing for one piston traversing the maximum radius of said cam bore increased leverage with respect to the other piston simultaneously traversing the cam portions and reduced radius portions of said bore.

2 Claims, 3 Drawing Figures 3,903,749

POWER TRANSMISSION

BACKGROUND OF THE INVENTION

Heretofore, various types of power transmissions have been provided wherein, weights have been mounted for radial adjustment with respect to a rotary housing and wherein, cam surfaces have been provided for controlling the radial position of a radially adjustable member.

The devices in the prior art are complicated and involved. Examples of such patents are as follows:

United States Patents;
2,969,076  3,392,634
3,241,463  1,636,998
French Patent:
809,374
British Patent:
1750

BRIEF DESCRIPTION OF THE INVENTION

It is an object of the present invention to provide an improved power transmission which will operate on principles of gravity and centrifugal force and wherein, pistons mounted upon a crankshaft within a housing are radially adjustable inwardly and outwardly and respond to an irregular cam surface bore upon the interior of said housing to provide increased leverage of one piston when moving along a portion of the bore of maximum radius with respect to a diametrically opposed piston moving along a bore of reduced radius or dimension to, thus, provide additional rotative thrust upon said crankshaft.

It is an object of the present invention to provide a novel support mounting for such transmission and the housing therefore, by which the housing may be rotatively advanced or retracted rotatively with respect to the rotatable pistons on said crankshaft for increasing or decreasing the speed thereof.

It is another object to provide an improved piston and piston rod arrangement whereby the pistons mount rollers on their outer surfaces for cooperative registry with an internal bore of varying radii and wherein, the pistons normally biased outwardly against said bore are adapted for radial inward movements relative to said piston rods.

It is another object to provide a power supply in connection with a power transmission as an improvement over present internal combustion engines, and for the reduction of air pollution.

These and other objects will be seen from the following specification and claims in conjunction with the appended drawing:

THE DRAWING

It will be understood that the above drawing illustrates merely a preferred embodiment of the invention and other embodiments are contemplated within the scope of the claims hereafter set forth.

DETAILED DESCRIPTION OF THE INVENTION

Figure 1:
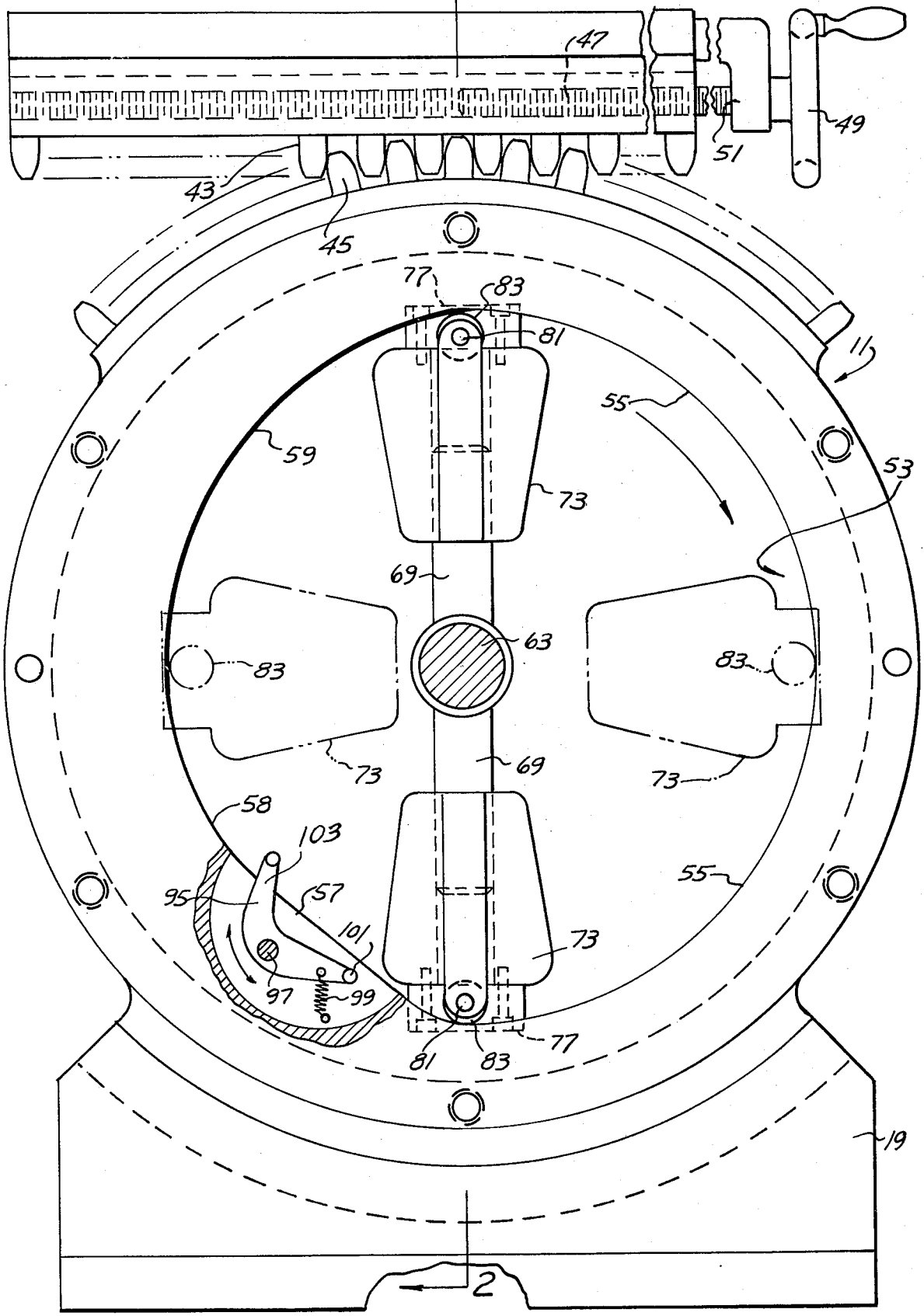
FIG. 1 is a fragmentary front elevational view of the present power transmission and housing with its front cover removed for clarity.
Figures 2, 3:
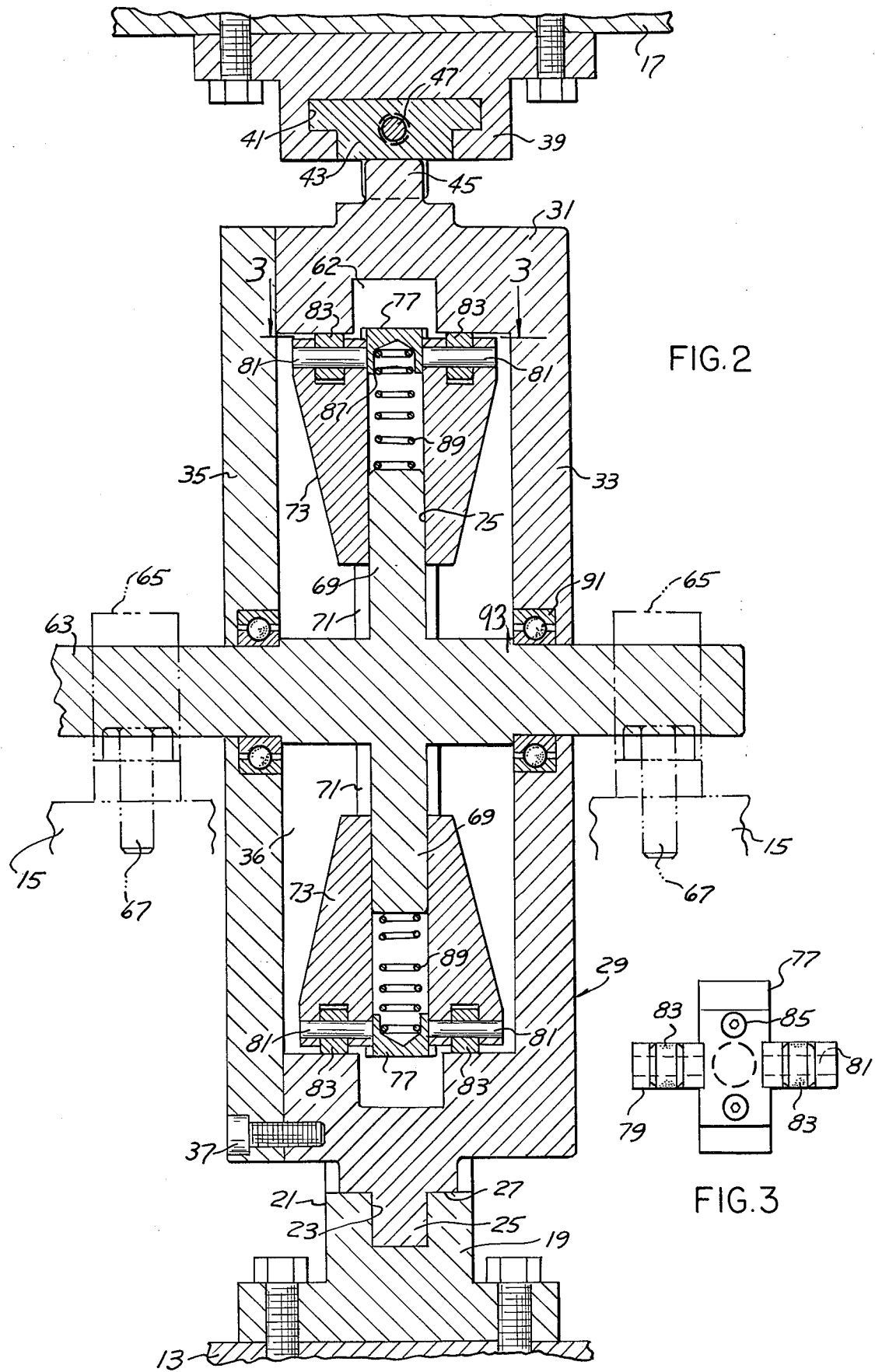
FIG. 2 is a vertical section taken in the direction of arrows 2—2 of FIG. 1.
FIG. 3 is an end view of the piston assembly taken in the direction of arrows 3—3 of FIG. 2.

Referring to the drawing, the present power transmission generally designed at 11, FIG. 1, involves three supports fragmentarily designated at 13, 15 and 17, FIG. 2. The base 19 is mounted upon support 13 and is suitably secured thereto and includes at its upper surface a concave circularly shaped bearing surface 21 and formed therein, a similarly shaped channel 23. The power transmission includes housing 29 with a cylindrical portion 31. Upon the lower surface portion of annular wall 31, there is provided arcuate or circularly shaped slide bearing 27 adapted for cooperative sliding surface registry with the bearing surface 21. Intermediate the sides of bearing 27 is a downwardly projecting similarly shaped guide 25 which cooperatively and guidably projects into arcuate channel 23.

Said housing 29 includes end wall 33 and at its opposite end the removably front plate 35 secured thereon by a series of fasteners 37 to define chamber 36.

The support for said housing includes an additional means by which the housing may be rotatively adjusted forwardly or rearwardly with respect to the base support 19, FIG. 1. For this purpose, a rack support 39 is arranged above said housing and is secured to support 17, fragmentarily shown, with suitable fasteners and includes at its undersurface an undercut T slot 41. A rack 43 of similar shape is slidably nested within said T slot and includes a series of gear teeth in cooperative mesh with a corresponding arcuate gear sector 45 on an upper surface portion of housing wall 31, FIGS. 1 and 2.

The feed screw 47 with suitable control handle 49 on one end is retained against longitudinal adjustment as at 51, FIg. 1, and threadedly engages said rack gear 43. Rotative adjustment of the hand wheel 49 in one direction or other will cause the housing 29 to rotatively and slidably advance or retract with respect to support 19.

Housing 29 has a cam bore 53 which consists of three sectors, for illustration. As shown in FIG. 1 there is a circular portion 55 of maximum radius which extends throughout 180° approximately. This circular portion gradually merges with the straight cam surface 57 of reduced center distance with respect to the axis of the housing and this surface, in turn, merges with an arcuate portion of minimum radius as at 58, FIG. 1. The surface area which includes the cam surface 57 and the arcuate portion 58 extends throughout an arc of approximately 90°. The latter merges with an arcuate portion 59 which starts at the minimum radius and gradually increases in radius to the maximum radius throughout the remainder or an arc of 90° approximately at the beginning of and merging with the portion of maximum radius 55.

Said housing on the inner surface of the annular wall and in communication with said cam bore is provided with an annular clearance channel 62, FIG. 2.

A crankshaft 63, fragmentarily shown, is journalled and supported on suitable bearings 65 anchored at 67 upon the supports 15 outside of and independent of housing 29. Said crankshaft includes at least one pair of diametrically arranged radially extending piston rods 69 which have longitudinal spline portions 71 adapted for cooperative sliding registry with respect to corresponding spline slots within the radial bore 75 of the corresponding piston 73 slidably mounted upon said piston rod. There may be additional pairs of said pistons and piston rods.

As shown in the drawing, suitable rollers 83 are provided upon and radially outward of the corresponding piston 73 for cooperative registry with cam bore 55, 57 and 59. This controls radial inward movements of the pistons with respect to their support piston rods. The coil springs 89 are interposed in compression between said piston and piston rod, normally urging the pistons radially outward so that the respective rollers are at all times in continuous operative engagement with the cam bore 53 within said housing.

The assembly of said rollers includes the end plate 77, FIG. 3, which extends transverse to the housing axis and is secured to the piston by fasteners 85. Said plate has a pair of opposed trunions 79 which support the stud shafts 81 which journal the respective rollers 83. Plate 77 intermediate its ends has a radial socket 87, which extends into the outer end portion of the piston bore 75 and is adapted to receive the outer end of compression spring 89, FIG. 2.

Axially aligned end thrust bearings 91 are nested within end wall 33 and front plate 35 of said housing to cooperatively receive intermediate portions of the crankshaft and with respect to the end thrust shoulders 93 formed therein.

The rock lever 95 is pivotally mounted at 97 upon the interior of the housing parallel to the housing axis and has a pair of arms 101 and 103. It is normally biased clockwise to the position shown in FIG. 1 by coil spring 99 anchored to said housing.

So positioned, the leading arm 101 is out of the path of rotary movement of the adjacent piston 73 as it rotates clockwise from the position shown in FIG. 1. As soon as said piston engages the second arm 103, it rotates said lever 95 about its support 97 against the action of the spring 99 in such a fashion that the end portion of the first arm 101 operatively engages as an end portion of said piston urging the same radially inward with respect to its support piston rod and, thus, cooperates with cam surface 57.

This provides a means by which an assist is given to the piston which moves adjacent the cam surface 57 to normally urge the said piston radially inward and, thus, arranged at a shorter center distance with respect to the axis of rotation of the crankshaft than the maximum radius at 55.

In operation, upon initial rotation of crankshaft 63 in a clockwise direction, the piston 73 at the top of FIG. 1 is moving with its rollers along the cam bore 55 of maximum radius and, thus, at an increased leverage with respect to the diametrically opposed piston. The latter has been moved radially inward by the cam surface 57. A mechanical advantage is provided exerting a rotary thrust upon the crankshaft.

The movement of each piston is modified and assisted by forces of gravity and centrifugal force for rotation in the direction shown by the arrows, FIG. 1.

The phantom showing of the pistons at 90° out of the initial position illustrates the leverage achieved between the first and second piston wherein, one piston is moving at a greater center distance than the other piston and has an increased leverage over the other piston.

The crankshaft can be speeded up or slowed down by advancing the housing 29 in the direction of rotation by actuation of the lead screw 47–49 in one direction or the other. The crankshaft is supported and journalled independently of the housing for rotating adjustment as desired.

The rack gear 43 has been illustrated as one means for advancing or retracting housing 29 with respect to the crankshaft. It is contemplated that any suitable means may be employed which has the effect of slidably and rotatively adjusting the housing with respect to its arcuate support 19.

Having described my invention, reference should now be had to the following claims:

1. A power transmission comprising a base support;
   a chambered cylindrical housing mounted on said support, having an end wall and a removable front plate with aligned apertures in said wall and plate on a horizontal axis;
   a rotatable crankshaft axially disposed through said housing with portions of said crankshaft journalled and mounted on supports on the exterior and independent of said housing;
   at least one pair of diametrically opposed piston rods on and projecting radially from said crankshaft within said housing;
   a radially adjustable piston slidably and non-rotatively mounted on each rod yieldably biased outwardly;
   cam rollers journalled upon said pistons on axes parallel to the housing axis;
   said housing having a continuous arcuate cam bore operatively engaging said rollers;
   said bore including a circular portion of maximum radius throughout 180° approximately; merging into a cam surface of reduced minimum dimension which merges into a circular portion of minimum radius for 90° approximately;
   and a run out arcuate portion of 90° approximately starting from said minimum radius to said maximum radius; whereby one piston when traversing the bore of maximum radius has an increased leverage with respect to the other piston simultaneously traversing the cam portions and reduced radius portions of said bore;
   the mountings of said pistons on said rods including a longitudinal spline therebetween.

2. In the transmission of claim 1, the mounting of said housing including a concave circularly shaped bearing surface on said base support with an intermediate similarly shaped channel; an arcuate depending bearing of similar shape slidably positioned upon said bearing surface; and a similarly shaped guide flange depending from said bearing guidably and retainingly nested in said channel; whereby said housing may be angularly and rotatably advanced and retracted relative to said support; operative means engageable with said housing at its upper portion for rotating said housing relative to said axis; said latter means including an arcuate gear segment on said housing and a manually controlled reciprocal rack gear in mesh with said gear segment.

* * * * *